Sept. 29, 1953 — E. C. ELSNER — 2,653,368
HOOK FASTENER
Filed Oct. 17, 1950
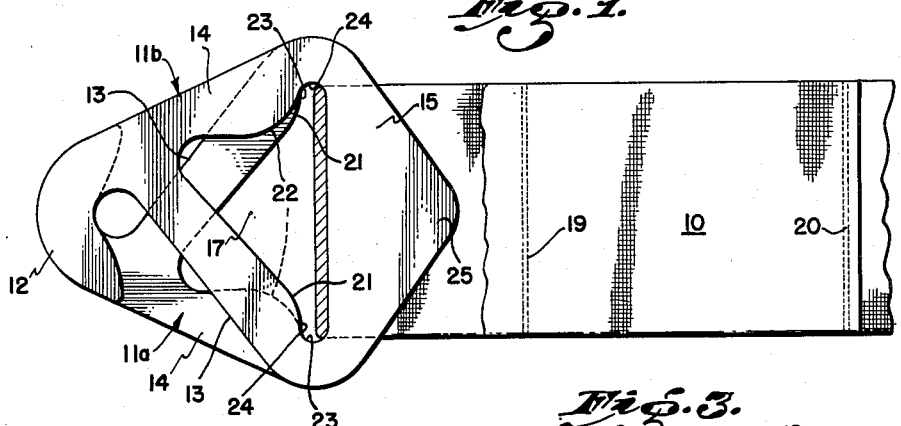
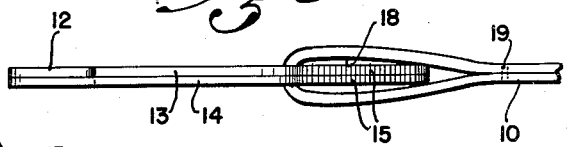
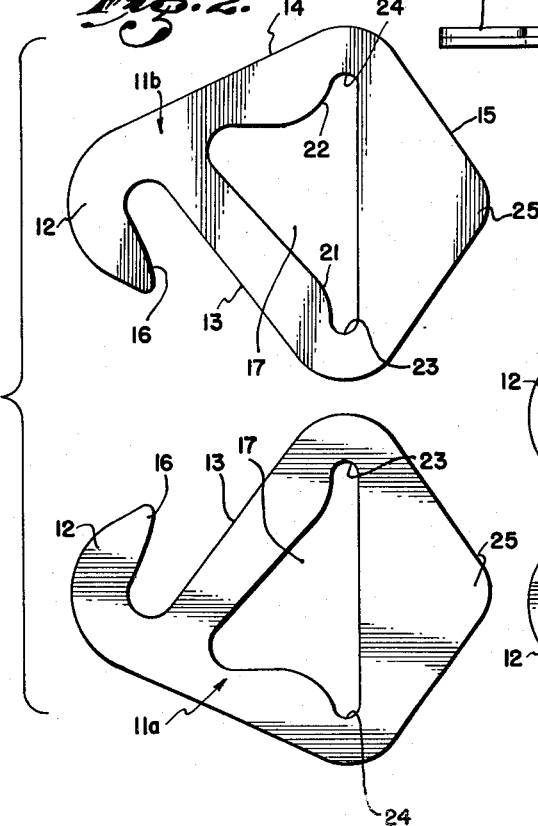
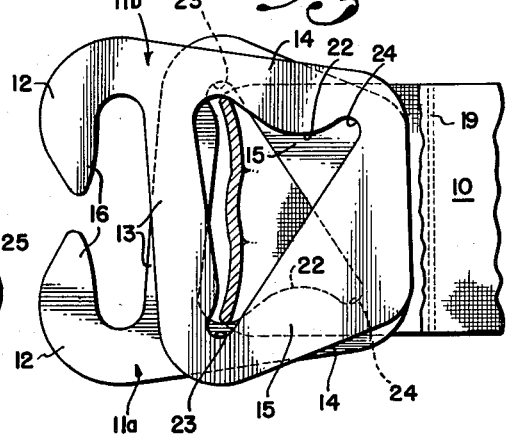
INVENTOR.
Edwin C. Elsner,
BY
ATTORNEY Patented Sept. 29, 1953

2,653,368

UNITED STATES PATENT OFFICE 2,653,368

HOOK FASTENER

Edwin C. Elsner, Glendale, Calif.

Application October 17, 1950, Serial No. 190,472

6 Claims. (Cl. 24—242)

The present invention relates generally to fastening means, and is more particularly concerned with hook fasteners of the type wherein mating hook parts serve as mousing for each other.

One object of the herein described invention is to provide improved fastening means of novel construction, which are susceptible of general use, but are particularly advantageous for use as a safety seat-belt in airplanes, which is easily attached and detached, which may be utilized interchangeably for right or left mounting; and which eliminates the use of conventional type spring loaded hooks or fasteners and their attending inherent disadvantages.

A further object of the invention is to provide a hook fastener having hook elements which co-operate in hooked position to serve as mousing for each other, and wherein the hooked elements are so formed as to latchingly co-operate with a tie member to releasably hold the hooked elements in either open or closed position but permit the elements to be readily moved from one position to the other.

A still further object is to provide a novel hook assembly utilizing mating or hook elements having a head bar portion adapted to receive a flexible strap member thereover, this bar being so constructed that it lockingly engages the marginal edges of the strap member, and is so reinforced as to provide in effect an extremely strong girder for receiving the tension forces applied to the strap. Moreover, the bar is so arranged that upon strap tension the bars of co-operatively associated hook elements are retained against hook separative movements.

Still another object of the present invention is to provide a hook element which is susceptible of being fabricated from a flat sheet material, in which the various parts may be so formed as to have great strength, and in which the elements may be interchangeably assembled as right and left co-operatively associated parts of the hook assemblage, thus permitting rapid and economic production.

Further objects of the invention will be brought out in the following part of the specification, wherein detailed description is for the purpose of fully disclosing the invention without placing limitations thereon.

Referring to the accompanying drawings, which are for illustrative purposes only:

Fig. 1 is a plan view illustrating a fastening means embodying the features of the present invention;

Fig. 2 is an exploded view showing the hook forming elements in laterally separated positions to show their respective details of construction;

Fig. 3 is a side elevational view of the fastening means shown in Fig. 1; and

Fig. 4 is a fragmentary plan view of the fastening means, partly in section, and showing the hook elements in open position as compared to the closed position in Fig. 1.

Referring generally to the drawings, there is illustrated in Fig. 1 a fastener embodying the features of the present invention. In this instance the fastener is disclosed as embodying an elongate strap or belt 10 of webbing or other suitable material which is secured at one end to a pair of co-operatively associated hook structures 11a and 11b.

The hook structures 11a and 11b are similarly constructed, being assembled into co-operative relationship merely by reversing one with respect to the other, as shown in Fig. 1. It is therefore believed that it will only be necessary to discuss the details of construction of one of the hook structures.

The hook structures are fabricated from flat sheet material by die punching or other suitable method. As shown, each hook structure has a curved end which defines a hook end portion 12. The end portion 12 is integrally formed and extends from a divided shank which is formed by diverging legs 13 and 14 which are connected at their divergent ends with the ends of a head bar portion 15. As thus formed it will be observed that the leg 13 co-operates with the hooked end portion 12 to define an entrance opening 16 to the hook, and also that the leg 13 presents an outer edge which serves to guide a member into the hook upon which the hook is to be secured.

The legs 13 and 14 co-operate with the head bar portion 15 to form a generally triangular opening or eye 17. With the hook structures 11a and 11b placed in superposed intimate face contact as shown in Fig. 1, the openings or eyes 17 are partially in registration, and the hook structures are secured to the belt 10 by training an end thereof over the head bar portion of the hook structures, this end portion of the belt being carried back to form a loop 18. The end portion of the belt may be secured as by lines of stitchings 19 and 20, or by other suitable means.

As shown in Fig. 2, the leg 13 forms a long leg of the triangular structure, whereas the leg 14 provides a short leg. The triangular opening defining edge of leg 13 is of substantially the same length as the opening defining edge of the head bar portion 15. The inner edges of legs 13 and 14 are respectively inwardly bulged as indicated at 21 and 22, these bulged edge portions co-operating with the adjacent edge portions of the head bar portion 15 to form triangle corner notches 23 and 24 at the ends of the head bar portion 15.

The belt 10 is selected of appropriate width so that the marginal edges of the belt will be disposed in the notches 23 and 24 when the hook structures 11a and 11b are in the position shown in Fig. 1, with the hooks 12 in hooked or closed position so that each hook provides a mousing for the other to prevent unhooking when pulling forces are applied. The marginal edges of the belt 10 lying within the notches 23 and 24 therefore act as locking means to prevent during use the swinging of the hook structures to unhooked or open position as shown in Fig. 4.

However, as shown in Fig. 4, it will be observed that when pulling forces are relieved on the belt 10, the hook structures 11a and 11b may be swung to opening position, and that during this movement the looped end of loop 18 is moved from a position adjacent the inner edge of the head bar portion 15 to a position wherein it lies adjacent the inner edges of legs 13, with the edge bulges 22 assuming a position along the outer surface of the belt loop 18 or being disposed within the loop, as shown in Fig. 4. In either case, the corner notches adjacent the ends of the legs 13—13 serve to releaseably retain or latch the hook structure in hook opening position.

A further feature of the invention resides in constructing the head bar portion 15 so that it will act as a girder member to carry the load imposed thereon. The head bar portion is reinforced by providing increased area between its ends, as by tapering the width of the bar portion toward its ends, as shown. As thus constructed the bar portion has a bulged or increased width as designated by the numeral 25.

By constructing the head bar portion 25 as described above, an additional advantage is obtained in that large surface areas of contact are provided within the loop 18 so that when a pulling is exerted on the belt 10, the sides of the loop 18 act on the wide head bar portion 25 in such a way as to oppose swinging separation of the hooked end portions 12 away from each other about the head bar portion as an axis.

I claim:

1. Fastener means, comprising: a pair of superposed members having oppositely extending hooked end portions adapted in hooked position to serve as mousing for each other; a pair of integral legs diverging from each hooked end portion; an integral elongate bridging head portion connecting the divergent ends of said legs and cooperating with said legs to form an eye; a transversely flexible tie member extending through said eyes of the superposed members and around said bridging head portions, whereby the tie member under tension forces acts to restrain the members against lateral movement to positions with the hooked end portions separated from each other, and detent means releasably opposing movement of the flexible member away from said bridging head portion, when said tension forces are released.

2. Fastener means, comprising: a pair of superposed members having oppositely extending hooked end portions adapted in hooked position to serve as mousing for each other; a pair of integral legs diverging from each hooked end portion; and integral elongate bridging head portion connecting the divergent ends of said legs and co-operating with said legs to form a generally triangular opening; a flexible strap member extending through said triangular openings of the superposed members, said strap in opened position of the hook members being adjacently positionable along corresponding legs of said members and in closed position along the head bar portions of said members; and means acting to releaseably oppose relative movement of said strap from one of said positions to the other.

3. Fastener means, comprising: a pair of superposed members having oppositely extending hooked end portions adapted in hooked position to serve as mousing for each other; a pair of integral legs diverging from each hooked end portion; an integral elongate bridging head portion connecting the divergent ends of said legs and co-operating with said legs to form a generally triangular opening in each member; a flexible strap member extending through said triangular openings of the superposed members about which said members are generally rotatable to opened and closed hook positions, said strap in opened position of the hook members being adjacently positionable along corresponding legs of said members and in closed position along the head bar portions of said members; and projections on the other legs of said members adapted to frictionally engage the strap edges and oppose relative movement of the strap to said positions.

4. As an article of manufacture, a fastener element, comprising: a flat plate-like member having a hook-shaped end portion, a pair of integrally formed legs diverging from said end portion, and a bridging head bar portion connecting the divergent ends of said legs and co-operating with said legs to form a generally triangular opening including corner notches at the junctions of the opposite ends of said head portion with the associated ends of said legs, said notches being adapted to receive the edge margins of and releasably retain a strap trained over the bar portion.

5. As an article of manufacture, a fastener element, comprising: a flat plate-like member having a hook-shaped end portion, a pair of integrally formed legs diverging from said end portion, and a bridging head bar portion connecting the divergent ends of said legs and co-operating with said legs to form a generally triangular opening, said legs having their opening defining edges inwardly extended adjacent the ends of said bar portion and cooperating therewith to define corner notches adapted to releasably receive the opposite edge margins of a transversely flexible strap trained over the bar positions.

6. As an article of manufacture, a fastener element, comprising: a flat plate-like member having a hook-shaped end portion, a pair of legs diverging from said end portion, one of said legs being longer than the other of said legs and a bridging head bar portion connecting the divergent ends of said legs and co-operating with said legs to define a generally triangular opening in which the opening defining edges of said long legs and said bar portion are substantially the same length, and an inwardly bulged opening defining edge margin on the other of said legs between its ends, whereby an associated strap member trained through said opening may be selectively shifted to dwell positions on opposite sides of said bulged edge margin.

EDWIN C. ELSNER.

References Cited in the file of this patent

UNITED STATES PATENTS

| Number | Name | Date |
|---|---|---|
| 147,262 | Hedenberg | Feb. 10, 1874 |
| 355,887 | Rylander | Jan. 11, 1887 |
| 384,512 | Dillon | June 12, 1888 |
| 1,241,806 | Anderson | Oct. 2, 1917 |
| 1,310,548 | Sandstrom | July 22, 1919 |

FOREIGN PATENTS

| Number | Country | Date |
|---|---|---|
| 588,206 | France | July 12, 1924 |